Nov. 6, 1956
J. MÜLLER
2,769,893
ELECTRICAL DEVICE FOR TESTING THE WELDABILITY
OF METALLIC MATERIALS
Filed July 8, 1952
2 Sheets-Sheet 1
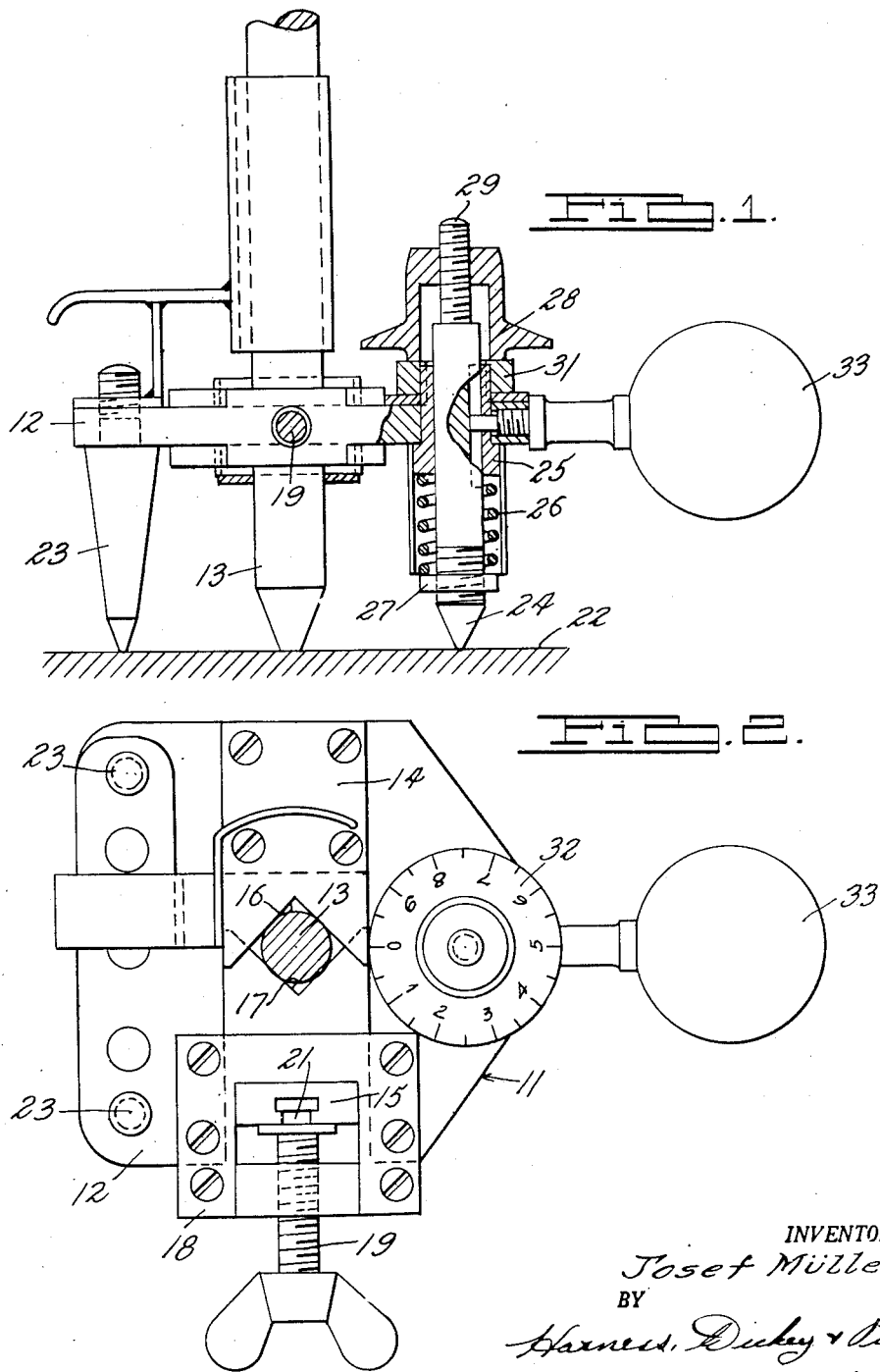
INVENTOR.
Josef Müller.
BY
Harness, Dickey & Pierce
ATTORNEYS.

INVENTOR
JOSEF MÜLLER

United States Patent Office 2,769,893
Patented Nov. 6, 1956

2,769,893
ELECTRICAL DEVICE FOR TESTING THE WELDABILITY OF METALLIC MATERIALS

Josef Müller, Detmold, Germany

Application July 8, 1952, Serial No. 297,708

Claims priority, application Germany July 12, 1951

4 Claims. (Cl. 219—109)

This invention relates to an electrical device designed to test the suitability of metallic materials for fusion welding. It is an object of this invention to offer a simple and easily handled appliance that is intended to convey reliable information on such properties as are considered essential for the welding operation by permitting a rapid and accurately controlled welding of the material to be tested.

The only known tests for the weldability of metallic materials have been carried out in the form of test welds where a test piece is clamped in a suitable holding device and subjected to welding. The necessity of employing a clamping device, the treatment of the test specimens, and the welding operation have rendered this test method fairly troublesome and expensive, as well as leading to a certain unreliability in the results obtained.

The present invention not only overcomes the aforesaid disadvantages but also enables the test results to be expressed in a simple and reliable manner by index numbers on a scale or marks on a curve, thus simplifying the selection of suitable materials for purposes of fusion welding. The development of this method was the result of previously gained information on the hitherto unknown physical causes for so-called welding cracks and welding seam cracks, as well as for welding brittleness which is related through causality to the former. Contrary to the general opinion hitherto expressed, it is an established fact that a susceptibility to welding cracks, welding seam cracks, and welding brittleness exists irrespective of the welding technique employed as well as of the shape and thickness of the metal part to be tested. These defects are of an equal nature both in cause and effect and are dependent on the physical composition of the metal. The testing device of the present invention is adapted to operate in a manner consistent with these principles to produce a series of test welds of a controlled and predetermined nature, by means of which the weldability of a specimen under all conditions may be determined.

In the drawings:

Figure 1 is an elevational view, partly in cross-section, of a welding test device constructed according to the principles of the invention;

Figure 2 is a plan view of the device showing the clamping means; and

Figure 3:
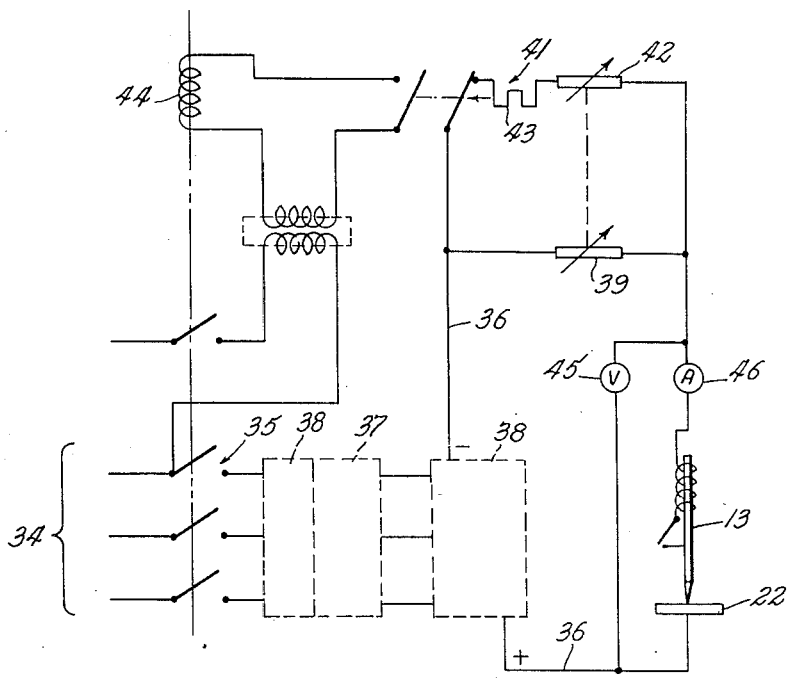
Figure 3 is a schematic circuit diagram showing the electrical apparatus used with the testing device.

The testing device proper is generally indicated at 11 and includes a base plate 12 which carries clamping means for a welding electrode 13 such as a carbon electrode. In particular, the clamping means includes a stationary clamping plate 14 and a movable clamping plate 15, plates 14 and 15 facing V-shaped recesses 16 and 17 respectively. Clamping plate 15 is slidably mounted on base 12 by means of guide brackets 18, and is adjustable by means of a manually rotatable set screw 19 threadably mounted on the base. By rotating set screw 19, which engages clamping plate 15 at 21, this clamping plate may be urged toward stationary clamping plate 14 to clamp the electrode 13 in place.

Base 12 is adapted to be supported on a test specimen 22 by means of a plurality of rigid supporting pins 23, two such pins being shown in the illustrated embodiment. A third pin 24 forms a tripod support with the other two pins, pin 24 being resiliently mounted and movable between a retracted and an extended position. In particular, pin 24 is slidably supported by a bushing 25 which is held by base 12, and a coil spring 26 is disposed between bushing 25 and a shoulder 27 on pin 24 and urges the pin outwardly. The limit of outward extension of pin 24 is determined by an adjustable stop member 28 which is threaded on an extension 29 at the upper end of pin 24. The lower surface of stop 28 engages a collar 31 carried by base 12, and it will therefore be seen that by rotating stop 28 the degree of outward movement of pin 24 may be varied. Preferably, stop 28 has marked calibrations as shown at 32 so that the amount of extension of pin 24 may be predetermined. A handle 33 is secured to the end of base 12 adjacent retractable pin 24, and downward force on this handle serves to depress the base and retract pin 24, thereby moving electrode 13 closer to the work.

The operation of the testing device 11 will be apparent from the foregoing description. Electrode 13 is first clamped between clamping plates 14 and 15 so that when pin 24 is in its extended position the tripod support will hold the electrode a predetermined distance from test specimen 22, as determined by the setting of stop 28. When it is desired to strike an arc, handle 33 is depressed, lowering base 12 and retracting pin 24 until electrode 13 contacts the specimen and an arc is struck. Handle 33 is then released, and pin 24 will be extended by spring 26 until stop 28 engages the collar 31. This engagement will hold the electrode 13 a predetermined distance from the specimen so that the length of the arc is known for test purposes.

Figure 3 shows schematically a suitable electrical circuit for operating the testing device. A source of power supply is indicated at 34 and may comprise a three-phase alternating current source. The current is fed through a supply switch generally indicated at 35 to a supply circuit 36 for applying current between electrode 13 and specimen 22. A transformer 37 and a no-load voltage regulator 38 are preferably disposed between the power source and the welding circuit 36, a rectifier 38 being also placed in the circuit. A variable resistance 39 is disposed in welding circuit 36 so that the intensity of current may be varied.

The circuit also includes a timing device generally indicated at 41, and in the illustrated embodiment this timer may comprise an adjustable thermostat 42 in parallel with welding circuit 36, a regulating resistance 43, and a solenoid 44 controlled by the thermostat for operating switch 35. A voltmeter 45 and an ammeter 46 are disposed in welding circuit 36 so that the amount of electrical energy supplied during each weld may be indicated.

When using the testing device to test the weldability of a specimen 22, the electrode 13 is first brought into contact with the test specimen and an arc drawn in the manner described above. A weld will then be applied to the test specimen, the intensity of the weld being predetermined by the setting of resistor 39 and timer thermostat 42, and the amount of electrical energy being measured by voltmeter 45 and ammeter 46. After the weld has cooled down it will be examined as to the formation of cracks. If no cracks have developed, the welding operation will be repeated a second and, if need be, a third time, by which the circular area of the first weld will be successively expanded. Normally each of the successive welds will surpass the preceding one by the amount of heat employed. After each welding operation and the subsequent cooling down, another examination as to any formation of cracks will be made. These tests will be continued until a manifestation of cracks is finally observed. The number of individual tests required and the sum total of the various heat quantities employed set the standard not only for the suitability of the test specimen for fusion welding in general but also for the degree of suitability. In other words, the earlier welding cracks set in on a given test specimen, the poorer will be its suitability. With the aid of a suitable chart on which the index number can be read off in terms of volt-ampere-seconds, thereby indicating the degree of quality or suitability, the entire test may be carried out in a purely mechanical manner and within a very short time.

The test specimen should have a surface of a few square centimeters. It will be observed that when carrying out several welding tests, a possible lack of uniformity of the material in respect of its metallographic structure may be ascertained.

In a reciprocal manner, testing of electrodes and welding wire could also be carried out by means of the device of the present invention, which would represent a cheaper and simpler method than those hitherto employed. To this end, the carbon electrode is replaced by the welding wire to be tested with which welds are made on a plate having a determinate degree of susceptibility to weld cracking. The greater the cracking susceptibility of the electrode, the sooner these test welds will lead to welding cracks as the area increases in size and thus in contraction. In an essentially similar manner even such test specimens could be treated as are found unsuitable for the welding tests described in the beginning, owing to their insufficient two-dimensional expansion.

What is claimed is:

1. In a device for testing the weldability of a metallic specimen, means for holding an electrode adjacent said specimen, said means including a clamp for said electrode, a plurality of pins supporting said clamp and engageable with the specimen, one of said pins being resiliently mounted whereby its effective length may be varied, a stop for predetermining the extended length of said resiliently mounted pin, means for adjustably setting said stop, said clamp being movable between a first position in which said resiliently mounted pin is retracted and said electrode contacts said specimen, and a second position in which said resiliently mounted pin is extended and said electrode is held a predetermined distance from said specimen, a circuit for applying current between said electrode and specimen, and means for indicating the quantity of electrical energy supplied by said circuit.

2. In a device for testing the weldability of a metallic specimen, means for holding an electrode adjacent said specimen, said means including a clamp for said electrode, means supporting said clamp and engageable with the specimen, at least a portion of said supporting means being resiliently mounted whereby the effective distance of the electrode from the specimen may be varied, a stop for predetermining the extended length of said resiliently mounted portion of the supporting means, said clamp being movable between a first position in which said resiliently mounted portion is retracted and said electrode contacts said specimen, and a second position in which said resiliently mounted portion is extended and said electrode is held a predetermined distance from said specimen, a circuit for applying current between said electrode and specimen, and means for indicating the quantity of electrical energy supplied by said circuit.

3. In a device for testing the weldability of a metallic specimen, means for holding an electrode adjacent said specimen, said means including a clamp for said electrode, means supporting said clamp and engageable with the specimen, at least a portion of said supporting means being resiliently mounted whereby the effective distance of the electrode from the specimen may be varied, a stop for predetermining the extended length of said resiliently mounted portion of the supporting means, means for adjustably setting said stop, said clamp being movable between a first position in which said resiliently mounted portion is retracted and said electrode contacts said specimen, and a second position in which said resiliently mounted portion is extended and said electrode is held a predetermined distance from said specimen, a circuit for applying current between said electrode and specimen, and means for indicating the quantity of electrical energy supplied by said circuit.

4. In a device for testing the weldability of a metallic specimen, means for holding an electrode adjacent said specimen, said means including a clamp for said electrode, a plurality of pins supporting said clamp and engageable with the specimen, one of said pins being resiliently mounted whereby its effective length may be varied, and a stop for predetermining the extended length of said resiliently mounted pin, said clamp being movable between a first position in which said resiliently mounted pin is retracted and said electrode contacts said specimen, and a second position in which said resiliently mounted pin is extended and said electrode is held a predetermined distance from said specimen.

References Cited in the file of this patent

UNITED STATES PATENTS

| | | | |
|---|---|---|---|
| Re. 22,310 | Nelson | May 11, | 1943 |
| 1,230,357 | Woodrow | June 19, | 1917 |
| 1,534,288 | Smith | Apr. 21, | 1925 |
| 1,985,107 | Roth | Dec. 18, | 1934 |
| 2,322,052 | Ogden | June 15, | 1943 |
| 2,415,708 | Sciaky | Feb. 11, | 1947 |
| 2,442,449 | Zimmerman | June 1, | 1948 |
| 2,622,179 | Butterfield | Dec. 16, | 1952 |

FOREIGN PATENTS

| | | | |
|---|---|---|---|
| 619,962 | Great Britain | Mar. 17, | 1949 |